United States Patent
Wang et al.

(10) Patent No.: US 10,095,333 B2
(45) Date of Patent: Oct. 9, 2018

(54) TOUCH APPARATUS

(71) Applicant: UNIDISPLAY INC., Hsinchu County (TW)

(72) Inventors: Wei-Chieh Wang, Yunlin County (TW); Meng-Chia Chan, Taichung (TW); Sheng-Hsien Lin, Tainan (TW); Chun-Heng Lin, Taichung (TW)

(73) Assignee: UNIDISPLAY INC., Hsinchu County (TW)

( * ) Notice: Subject to any disclaimer, the term of this patent is extended or adjusted under 35 U.S.C. 154(b) by 59 days.

(21) Appl. No.: 15/014,014

(22) Filed: Feb. 3, 2016

(65) Prior Publication Data

US 2017/0160846 A1   Jun. 8, 2017

(30) Foreign Application Priority Data

Dec. 2, 2015  (TW) .............................. 104219319 U

(51) Int. Cl.
*G09G 5/00* (2006.01)
*G06F 3/041* (2006.01)
*G02F 1/155* (2006.01)
*G02F 1/157* (2006.01)

(52) U.S. Cl.
CPC ............ *G06F 3/0412* (2013.01); *G02F 1/155* (2013.01); *G02F 1/157* (2013.01); *G06F 3/0416* (2013.01)

(58) Field of Classification Search
CPC ...... G06F 3/044; G06F 3/0412; G06F 3/0416; G02B 27/2214; G02B 27/225; G02F 1/163; G02F 1/155; G02F 1/157

USPC ...................... 345/87, 89, 173; 359/269, 273
See application file for complete search history.

(56) References Cited

U.S. PATENT DOCUMENTS

| | | | | |
|---|---|---|---|---|
| 2007/0201122 A1* | 8/2007 | Dozeman | ................ | B60R 1/088 359/265 |
| 2011/0279401 A1* | 11/2011 | Hong | ...................... | G06F 3/044 345/174 |
| 2014/0111476 A1* | 4/2014 | You | ...................... | G09G 3/3655 345/174 |
| 2015/0251604 A1* | 9/2015 | Kukita | .................... | G02F 1/155 359/266 |
| 2015/0323849 A1* | 11/2015 | Han | ........................ | G02F 1/15 359/270 |
| 2016/0005375 A1* | 1/2016 | Naijo | ...................... | G09G 3/38 345/690 |
| 2016/0266705 A1* | 9/2016 | Chang | .................... | G06F 3/044 |
| 2017/0048516 A1* | 2/2017 | Yang | ...................... | G06F 3/044 |

* cited by examiner

*Primary Examiner* — Jennifer Nguyen
(74) *Attorney, Agent, or Firm* — JCIPRNET

(57) ABSTRACT

A touch apparatus including a first substrate, a first translucent electrode, a second substrate, an electrochromic layer, a reflective film, and a touch sensing structure is provided. The first substrate has a first inner surface and a first outer surface opposite to each other. The first translucent electrode is disposed on the first inner surface. The second substrate is disposed opposite to the first substrate. The electrochromic layer is located between the first inner surface of the first substrate and the second substrate. The reflective film is disposed on the second substrate. The touch sensing structure is disposed on the first outer surface of the first substrate.

6 Claims, 6 Drawing Sheets

TOUCH APPARATUS

CROSS-REFERENCE TO RELATED APPLICATION

This application claims the priority benefit of Taiwan application serial no. 104219319, filed on Dec. 2, 2015. The entirety of the above-mentioned patent application is hereby incorporated by reference herein and made a part of this specification.

BACKGROUND OF THE INVENTION

Field of the Invention

The invention relates to an electronic apparatus and particularly relates to a touch apparatus.

Description of Related Art

Electrochromism refers to the technology that, when applied with a voltage or current, an electrochromic layer can exhibit a stable reversible change in optical properties (e.g. transmittance, reflectivity, or absorbance) in the visible light wavelength range, so as to present a change in color/transparency. The technology of electrochromism may be applied to various fields, such as energy-efficient windows, automotive rearview mirrors, and display devices.

Take the automotive rearview mirror for example, in order to provide multiple functions, a touch sensing structure is disposed in front of an electrochromic reflective mirror for the user to check the rear through the electrochromic reflective mirror as well as operate the electrochromic reflective mirror by the touch sensing structure. According to the conventional technology, the touch sensing structure is first disposed on a carrier board to form an out-cell touch panel, and then the out-cell touch panel is attached to the surface of the electrochromic reflective mirror to form the electrochromic reflective mirror having a touch function. Such a technique can provide the electrochromic reflective mirror with the touch function but would significantly increase the thickness of the electrochromic reflective mirror, which is a drawback in terms of appearance.

SUMMARY OF THE INVENTION

The invention provides a touch apparatus that has a touch function and is thin.

The touch apparatus of the invention includes a first substrate, a first translucent electrode, a second substrate, an electrochromic layer, a reflective film, and a touch sensing structure. The first substrate has a first inner surface and a first outer surface opposite to each other. The first translucent electrode is disposed on the first inner surface of the first substrate. The second substrate is disposed opposite to the first substrate. The electrochromic layer is located between the first inner surface of the first substrate and the second substrate. The reflective film is disposed on the second substrate. The touch sensing structure is disposed on the first outer surface of the first substrate.

In an embodiment of the invention, the reflective film is a transflective film. The touch apparatus further includes a display panel, the transflective film, the electrochromic layer, and the touch sensing structure that are sequentially stacked in a normal direction of the first outer surface.

In an embodiment of the invention, the reflective film is a totally reflective film.

In an embodiment of the invention, the second substrate has a second inner surface facing the electrochromic layer and a second outer surface opposite to the second inner surface. The reflective film is electrically conductive and disposed on the second inner surface of the second substrate and the display panel is disposed on the second outer surface of the second substrate.

In an embodiment of the invention, the first substrate further has a first side surface connecting the first inner surface and the first outer surface. The first translucent electrode extends from the first inner surface to the first side surface. The second substrate further has a second side surface connecting the second inner surface and the second outer surface. The reflective film extends from the second inner surface to the second side surface.

In an embodiment of the invention, the second substrate has a second inner surface facing the electrochromic layer and a second outer surface opposite to the second inner surface. The touch apparatus further includes a second translucent electrode. The second translucent electrode is disposed on the second inner surface of the second substrate. The reflective film is disposed on the second outer surface of the second substrate and the display panel is disposed on the reflective film.

In an embodiment of the invention, the touch sensing structure includes a first sensing unit and a second sensing unit. The first sensing unit is formed by connecting a plurality of first sensing pads and a plurality of bridge lines in series and is disposed on the first outer surface of the first substrate. The second sensing unit intersects the first sensing unit above the bridge lines and is located in the same layer as the first sensing pads.

In an embodiment of the invention, the touch apparatus further includes a protective substrate and an optical adhesive layer. The protective substrate covers the touch sensing structure. The protective substrate is bonded to the touch sensing structure through the optical adhesive layer.

In an embodiment of the invention, the touch sensing structure includes a plurality of first sensing units, a protective substrate, a plurality of second sensing units, and an optical adhesive layer. The first sensing units are disposed on the first outer surface of the first substrate. The second sensing units are disposed on the protective substrate and intersect the first sensing units. The second sensing units and the protective substrate are bonded to the first sensing units through the optical adhesive layer.

Based on the above, in the touch apparatus according to an embodiment of the invention, at least a portion of the touch sensing structure is formed on the substrate of the electrochromic reflective mirror. Thus, the touch apparatus may be thinned.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
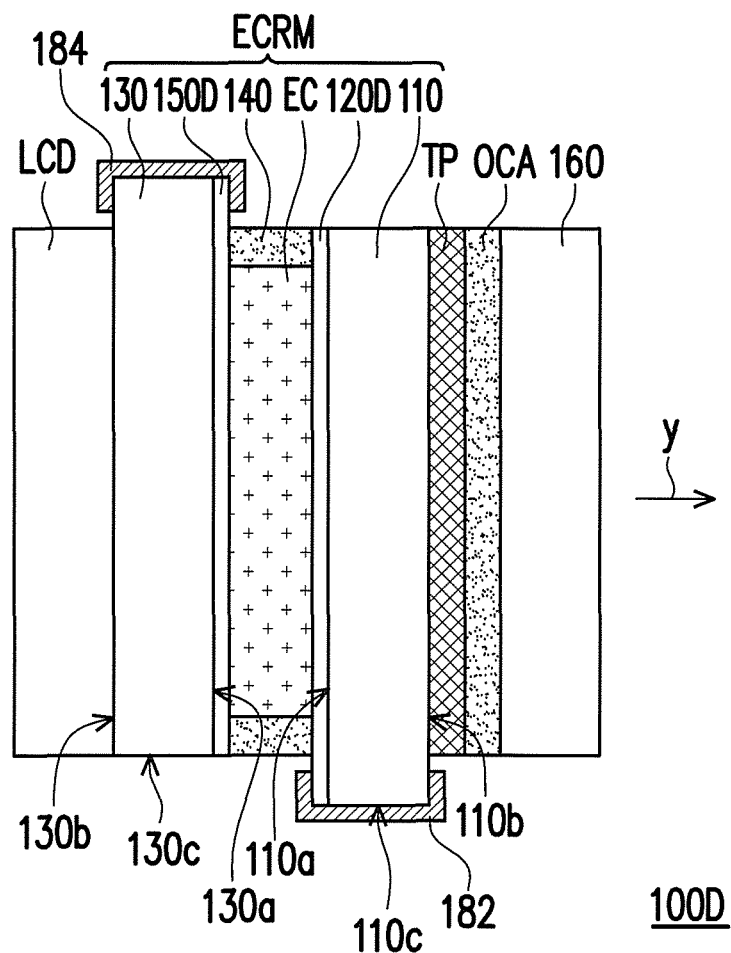
FIG. 1 is a schematic cross-sectional view of the touch apparatus according to an embodiment of the invention.

FIG. 1 is a schematic cross-sectional view of a touch apparatus according to an embodiment of the invention. A touch apparatus 100D of FIG. 1 is similar to a touch apparatus 100 of FIG. 2. Therefore, the same or corresponding components are assigned with the same or corresponding reference numerals. A difference between the touch apparatus 100D and the touch apparatus 100 is that: a first translucent electrode 120D and a reflective film 150D of the touch apparatus 100D are different from a first translucent electrode 120 and a reflective film 150 of the touch apparatus 100. Moreover, the touch apparatus 100D further includes conductive strips 182 and 184.

The following paragraphs elaborate on the differences. For the common parts, please refer to the corresponding description.

The touch apparatus 100D includes a first substrate 110, the first translucent electrode 120, a second substrate 130, an electrochromic layer EC, the reflective film 150D, and a touch sensing structure TP. The first substrate 110 has a first inner surface 110a and a first outer surface 110b opposite to each other. The first translucent electrode 120 is disposed on the first inner surface 110a of the first substrate 110. The second substrate 130 is opposite to the first substrate 110. The electrochromic layer EC is located between the first inner surface 110a of the first substrate 110 and the second substrate 130. The reflective film 150D is disposed on the second substrate 130. The touch sensing structure TP is disposed on the first outer surface 110b of the first substrate 110.

What distinguishes the touch apparatus 100D from the touch apparatus 100 is that, in this embodiment, the first translucent electrode 120D covers the first inner surface 110a and may not extend to a first side surface 110c. The reflective film 150D covers the second inner surface 130a and may not extend to a second side surface 130c. The touch apparatus 100D further includes the conductive strips 182 and 184. The conductive strip 182 clips the first substrate 110 and is electrically connected with the first translucent electrode 120D. The conductive strip 184 clips the second substrate 130 and is electrically connected with the reflective film 150D. The first translucent electrode 120D and the reflective film 150D for driving the electrochromic layer EC are electrically connected with a driving unit (e.g. a driving motherboard) by the conductive strips 182 and 184 respectively.

Figure 2:
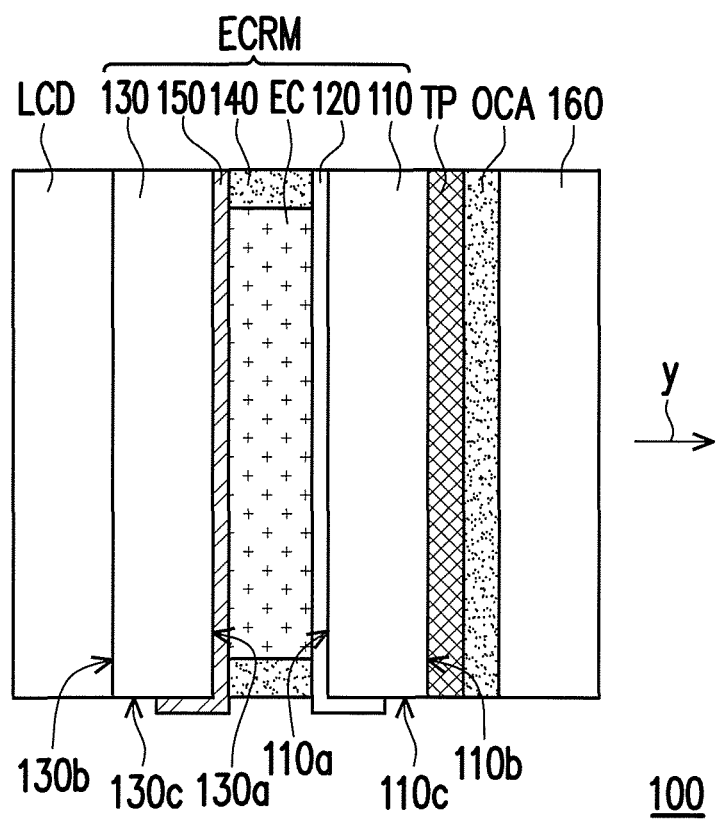
FIG. 2 is a schematic cross-sectional view of the touch apparatus according to an embodiment of the invention.

FIG. 2 is a schematic cross-sectional view of the touch apparatus according to an embodiment of the invention. Referring to FIG. 2, the touch apparatus 100 includes the first substrate 110. The first substrate 110 has the first inner surface 110a and the first outer surface 110b opposite to each other. The first substrate 110 further has the first side surface 110c connecting the first inner surface 110a and the first outer surface 110b. In this embodiment, the first substrate 110 is a translucent substrate. A material of the first substrate 110 is glass, for example, but the invention is not limited thereto. In other embodiments, the material of the first substrate 110 may be plastic, quartz, or other suitable materials.

Referring to FIG. 2, the touch apparatus 100 further includes the first translucent electrode 120. The first translucent electrode 120 is disposed on the first inner surface 110a of the first substrate 110. In this embodiment, the first translucent electrode 120 may cover the entire first inner surface 110a of the first substrate 110. Furthermore, the first translucent electrode 120 may selectively extend from the first inner surface 110a to the first side surface 110c. A portion of the first translucent electrode 120 located on the first side surface 110c may replace the conventional external conductive strip (or electrode pad) to be electrically connected with a driving unit (e.g. a driving motherboard). A material of the first translucent electrode 120 may be a metal oxide, such as indium tin oxide, indium zinc oxide, aluminum tin oxide, aluminum zinc oxide, indium germanium zinc oxide, other suitable oxides, or a stack layer including at least two of the foregoing, but the invention is not limited thereto.

It should be noted that the portion of the first translucent electrode 120 located on the first side surface 110c and the portion of the first translucent electrode 120 located on the first inner surface 110a are deposited in the same process. Therefore, the portion of the first translucent electrode 120 for replacing the conventional external conductive strip (or electrode pad) has a very small thickness, which helps to reduce the size of the touch apparatus 100. However, in the invention, the first translucent electrode 120 does not necessarily extend to the first side surface 110c. In other embodiments of the invention, the first translucent electrode 120 may cover the first inner surface 110a and selectively not extend to the first side surface 110c.

Referring to FIG. 2, the touch apparatus 100 further includes the second substrate 130. The second substrate 130 is disposed opposite to the first substrate 110. The second substrate 130 has a second inner surface 130a facing the electrochromic layer EC and a second outer surface 130b opposite to the second inner surface 130a. The second substrate 130 further has the second side surface 130c connecting the second inner surface 130a and the second outer surface 130b. In this embodiment, the second substrate 130 is a translucent substrate. A material of the second substrate 130 is glass, for example, but the invention is not limited thereto. In other embodiments, the material of the second substrate 130 may be plastic, quartz, or other suitable materials.

Referring to FIG. 2, the touch apparatus 100 further includes the electrochromic layer EC. The electrochromic layer EC is located between the first inner surface 110a of the first substrate 110 and the second substrate 130. Furthermore, the touch apparatus 100 further includes a frame adhesive 140. The frame adhesive 140 is located between the first substrate 110 and the second substrate 130 and surrounds the electrochromic layer EC. The frame adhesive 140, the first substrate 110, and the second substrate 130 together encapsulate the electrochromic layer EC.

Referring to FIG. 2, the touch apparatus 100 further includes the reflective film 150. The reflective film 150 is disposed on the second substrate 130. In this embodiment, the reflective film 150 may be selectively disposed on the second inner surface 130a of the second substrate 130. The reflective film 150 may cover the entire second inner surface 130a of the second substrate 130. Furthermore, the reflective film 150 may selectively extend from the second inner surface 130a to the second side surface 130c. A portion of the reflective film 150 located on the second side surface 130c may replace the conventional external conductive strip (or electrode pad) to be electrically connected with a driving unit (e.g. a driving motherboard). Likewise, using the portion of the reflective film 150 extending to the second side surface 130c to replace the conventional external conductive strip (or electrode pad) helps to reduce the size of the touch apparatus 100.

In this embodiment, the reflective film 150 has conductivity. The reflective film 150 and the first translucent electrode 120 may together drive the electrochromic layer EC. Specifically, when the electrochromic layer EC is enabled (for example, when a sufficient potential difference exists between the reflective film 150 and the first translucent electrode 120), an electrochemical oxidation-reduction reaction is generated in the electrochromic layer EC to change an energy level thereof, so as to present a dimming state. When an external light sequentially passes through the touch sensing structure TP, the first substrate 110, and the first translucent electrode 120 and reaches the electrochromic layer EC, the external light is absorbed by the electrochromic layer EC in the dimming state, such that the touch apparatus 100 (e.g. a rearview mirror for vehicles) is switched to an anti-glare mode. On the other hand, when the electrochromic layer EC is not enabled (for example, when no sufficient potential difference exists between the reflective film 150 and the first translucent electrode 120), the electrochromic layer EC presents a translucent state. At the moment, the external light that sequentially passes through the touch sensing structure TP, the first substrate 110, the first translucent electrode 120, and the electrochromic layer EC is reflected by the reflective film 150, such that the touch apparatus 100 (e.g. a rearview mirror for vehicles) is switched to a mirror mode.

In this embodiment, the reflective film 150 is a transflective film. The transflective film may reflect a portion of the light and allow a portion of the light to pass. Referring to FIG. 2, the touch apparatus 100 may further include a display panel LCD. The display panel LCD is disposed on the second outer surface 130b of the second substrate 130. The display panel LCD, the reflective film 150, the electrochromic layer EC, and the touch sensing structure TP are sequentially stacked in a normal direction y of the first outer surface 110b. Since the reflective film 150 is a transflective film, an image light beam emitted by the display panel LCD may pass through the reflective film 150 for the user to see the image displayed by the display panel LCD. Therefore, the touch apparatus 100 provides functions of a display and a reflective mirror.

Figure 3:
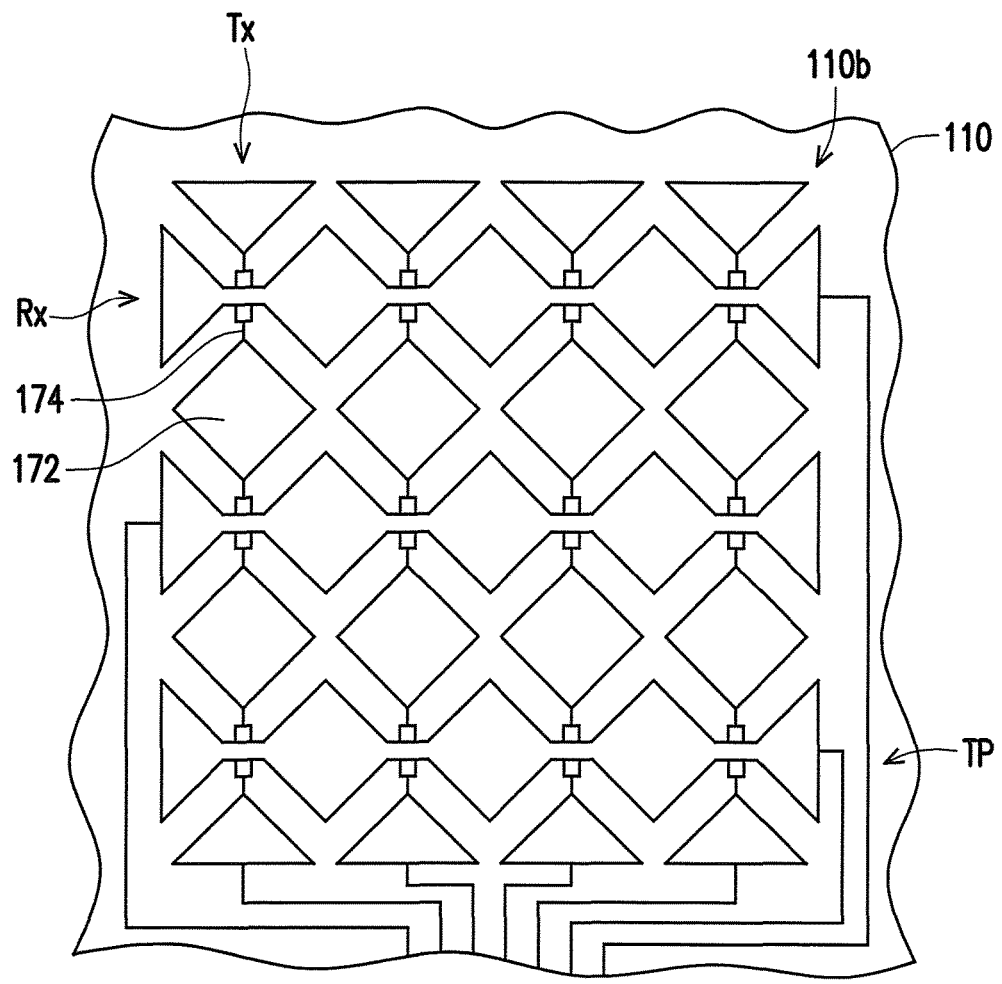
FIG. 3 is a schematic top view of the touch sensing structure TP of FIG. 2.

The touch apparatus 100 further has a touch function, which may be projected capacitive touch or surface capacitive touch. Referring to FIG. 2, the touch apparatus 100 includes the touch sensing structure TP. The touch sensing structure TP is disposed on the first outer surface 110b of the first substrate 110. The second substrate 130, the reflective film 150, the electrochromic layer EC, the first translucent electrode 120, and the first substrate 110 may be deemed as an electrochromic reflective mirror ECRM, and the touch sensing structure TP may be formed directly on the electrochromic reflective mirror ECRM. FIG. 3 is a schematic top view of the touch sensing structure TP of FIG. 2. Referring to FIG. 3, in this embodiment, the touch sensing structure TP includes a first sensing unit Tx and a second sensing unit Rx. The first sensing unit Tx and the second sensing unit Rx are disposed on the first outer surface 110b of the first substrate 110. The first sensing unit Tx is formed by connecting a plurality of first sensing pads 172 and a plurality of bridge lines 174 in series. The second sensing unit Rx is located above the bridge lines 174 to intersect the first sensing unit Tx. The second sensing unit Rx and the first sensing pads 172 of the first sensing unit Tx are in the same layer. In other words, the touch sensing structure TP of this embodiment is the so-called SITO (single ITO) structure. However, the invention is not limited thereto. In other embodiments, the touch sensing structure may also be other suitable structures.

Referring to FIG. 2, the touch apparatus 100 may further include a protective substrate 160. The protective substrate 160 covers the touch sensing structure TP to protect the touch sensing structure TP from damage. The touch apparatus 100 further includes an optical adhesive layer OCA. The protective substrate 160 is bonded to the touch sensing structure TP through the optical adhesive layer OCA. The protective substrate 160 may be a translucent substrate. A material of the translucent substrate is glass, PMMA, or PC (polycarbonate), for example, but the invention is not limited thereto.

Figure 4:
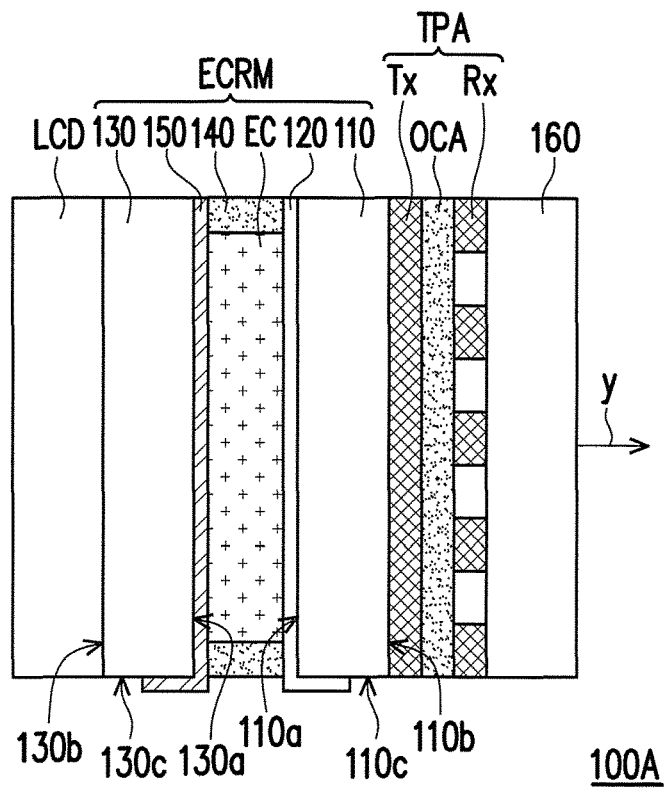
FIG. 4 is a schematic cross-sectional view of the touch apparatus according to another embodiment of the invention.

FIG. 4 is a schematic cross-sectional view of the touch apparatus according to another embodiment of the invention. A touch apparatus 100A of FIG. 4 is similar to the touch apparatus 100 of FIG. 2. Therefore, the same or corresponding components are assigned with the same or corresponding reference numerals. A difference between the touch apparatus 100A and the touch apparatus 100 is that: a touch sensing structure TPA of the touch apparatus 100A is different from the touch sensing structure TP of the touch apparatus 100. The following paragraphs elaborate on the difference. For the common parts, please refer to the description above.

Referring to FIG. 4, the touch apparatus 100A includes the first substrate 110, the first translucent electrode 120, the second substrate 130, the electrochromic layer EC, the reflective film 150, and the touch sensing structure TPA. The first substrate 110 has the first inner surface 110a and the first outer surface 110b opposite to each other. The first translucent electrode 120 is disposed on the first inner surface 110a of the first substrate 110. The second substrate 130 is opposite to the first substrate 110. The electrochromic layer EC is located between the first inner surface 110a of the first substrate 110 and the second substrate 130. The reflective film 150 is disposed on the second substrate 130. The touch sensing structure TPA is disposed on the first outer surface 110b of the first substrate 110.

Figure 5:
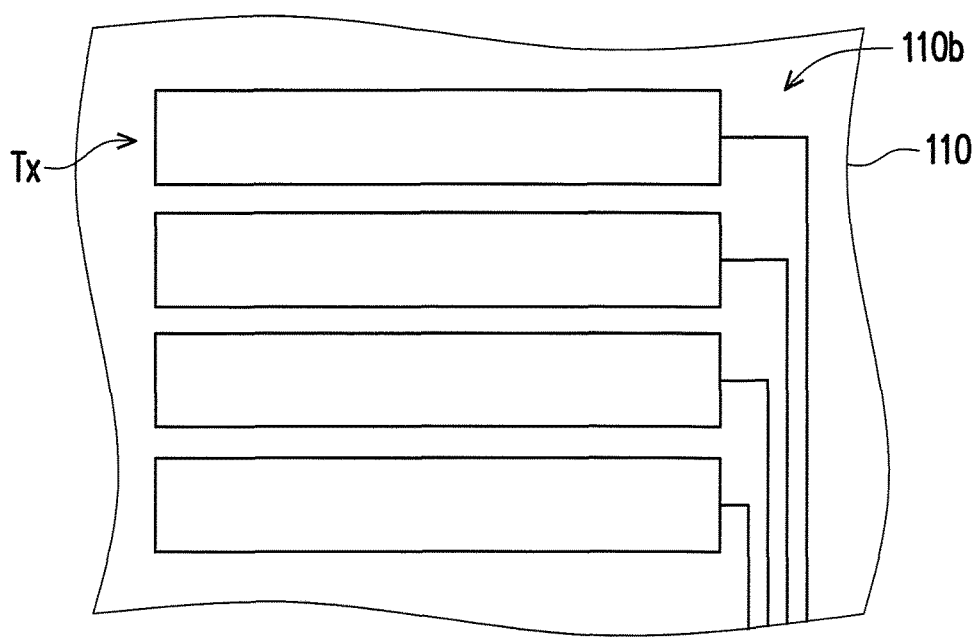
FIG. 5 is a schematic top view of the first sensing unit Tx and the first substrate 110 of FIG. 4.
Figure 6:
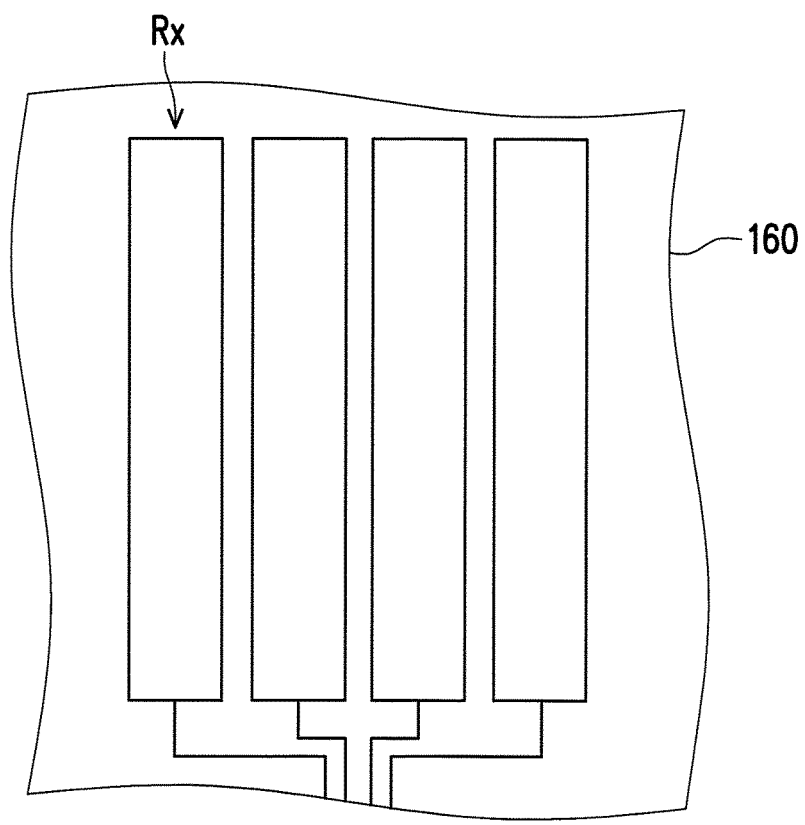
FIG. 6 is a schematic top view of the second sensing unit Rx and the second substrate 160 of FIG. 4.

FIG. 5 is a schematic top view of the first sensing unit Tx and the first substrate 110 of FIG. 4. FIG. 6 is a schematic top view of the second sensing unit Rx and the second substrate 160 of FIG. 4. Referring to FIG. 4, FIG. 5, and FIG. 6, the touch sensing structure TPA includes a plurality of first sensing units Tx, a plurality of second sensing units Rx, the protective substrate 160, and the optical adhesive layer OCA. Referring to FIG. 4 and FIG. 5, the first sensing units Tx are disposed on the first outer surface 110b of the first substrate 110. Referring to FIG. 5 and FIG. 6, the second sensing units Rx are disposed on the protective substrate 160. Referring to FIG. 4, FIG. 5, and FIG. 6, the second sensing units Rx and the first sensing units Tx intersect one another. As shown in FIG. 4, the second sensing units Rx and the protective substrate 160 are bonded to the first sensing units Tx through the optical adhesive layer OCA. In brief, the touch sensing structure TPA may be a DITO (double side ITO) structure, but the invention is not limited thereto.

Figure 7:
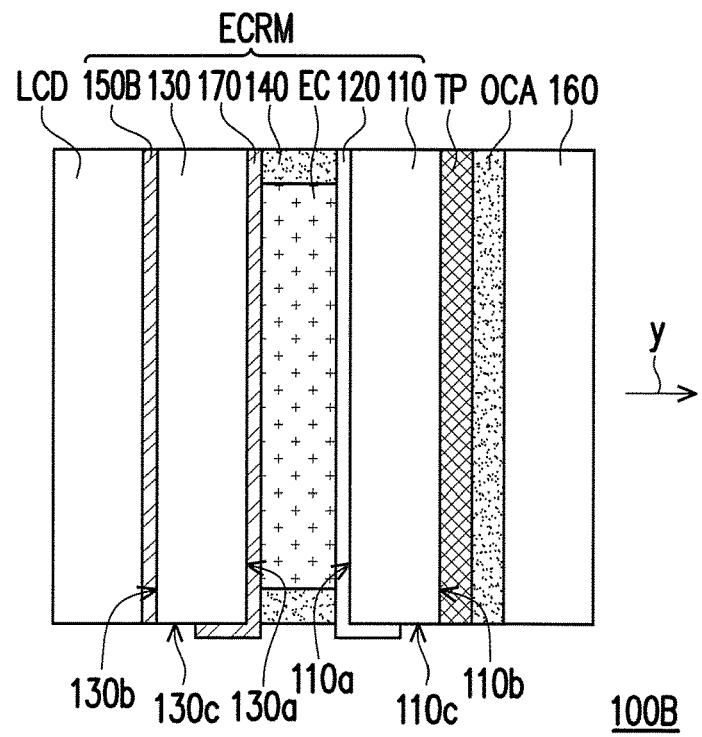
FIG. 7 is a schematic cross-sectional view of the touch apparatus according to another embodiment of the invention.

FIG. 7 is a schematic cross-sectional view of the touch apparatus according to another embodiment of the invention. A touch apparatus 100B of FIG. 7 is similar to the touch apparatus 100 of FIG. 2. Therefore, the same or corresponding components are assigned with the same or corresponding reference numerals. A difference between the touch apparatus 100B and the touch apparatus 100 is that: the position of a reflective film 150B of the touch apparatus 100B is different from the position of the reflective film 150 of the touch apparatus 100. The following paragraphs elaborate on the difference. For the common parts, please refer to the description above.

Referring to FIG. 7, the touch apparatus 100B includes the first substrate 110, the first translucent electrode 120, the second substrate 130, the electrochromic layer EC, the reflective film 150B, and the touch sensing structure TP. The first substrate 110 has the first inner surface 110a and the first outer surface 110b opposite to each other. The first translucent electrode 120 is disposed on the first inner surface 110a of the first substrate 110. The second substrate 130 is opposite to the first substrate 110. The electrochromic layer EC is located between the first inner surface 110a of the first substrate 110 and the second substrate 130. The reflective film 150B is disposed on the second substrate 130. The touch sensing structure TP is disposed on the first outer surface 110b of the first substrate 110.

In this embodiment, the reflective film 150B is a transflective film. The display panel LCD may be disposed in back of the reflective film 150B. The image light beam emitted by the display panel LCD may pass through the reflective film 150B for the user to see the image displayed by the display panel LCD. What distinguishes the touch apparatus 100B from the touch apparatus 100 is that the reflective film 150B is located on the second outer surface 130b of the second substrate 130, instead of the second inner surface 130a. In this embodiment, the reflective film 150B is not for driving the electrochromic layer EC and may be electrically conductive or not conductive. The touch apparatus 100B further includes a second translucent electrode 170 located on the second inner surface 130a. The first translucent electrode 120 and the second translucent electrode 170 are for driving the electrochromic layer EC. The second translucent electrode 170 extends from the second inner surface 130a to the second side surface 130c. A portion of the first translucent electrode 120 located on the first side surface 110c may replace the conventional external conductive strip (or electrode pad) to be electrically connected with a driving unit (e.g. a driving motherboard).

Figure 8:
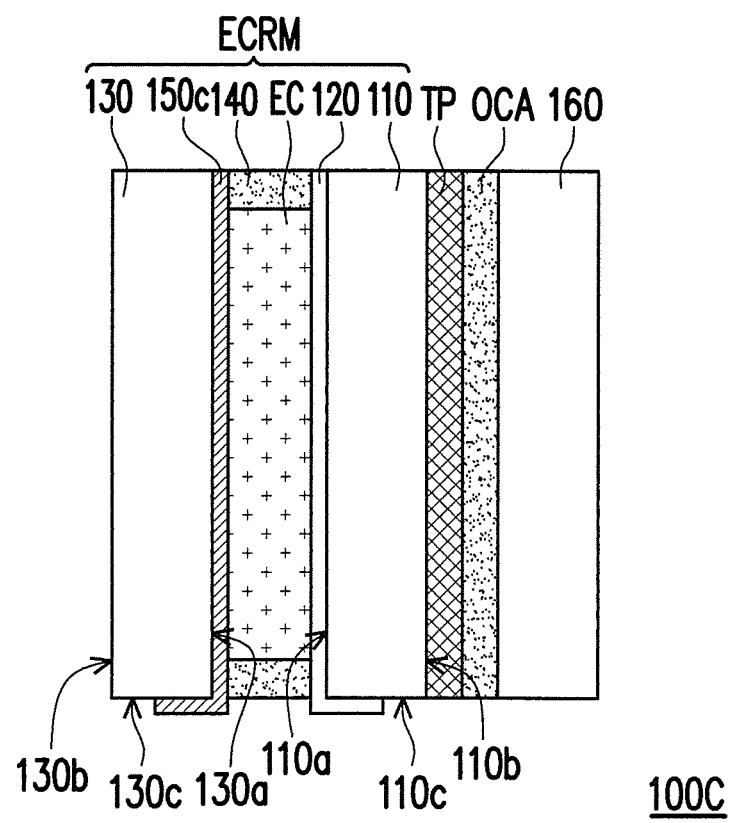
FIG. 8 is a schematic cross-sectional view of the touch apparatus according to yet another embodiment of the invention.

FIG. 8 is a schematic cross-sectional view of the touch apparatus according to yet another embodiment of the invention. A touch apparatus 100C of FIG. 8 is similar to the touch apparatus 100 of FIG. 2. Therefore, the same or corresponding components are assigned with the same or corresponding reference numerals. A difference between the touch apparatus 100C and the touch apparatus 100 is that: the position of a reflective film 150C of the touch apparatus 100C is different from the position of the reflective film 150 of the touch apparatus 100. The following paragraphs elaborate on the difference. For the common parts, please refer to the description above.

Referring to FIG. 8, the touch apparatus 100C includes the first substrate 110, the first translucent electrode 120, the second substrate 130, the electrochromic layer EC, the reflective film 150C, and the touch sensing structure TP. The first substrate 110 has the first inner surface 110a and the first outer surface 110b opposite to each other. The first translucent electrode 120 is disposed on the first inner surface 110a of the first substrate 110. The second substrate 130 is opposite to the first substrate 110. The electrochromic layer EC is located between the first inner surface 110a of the first substrate 110 and the second substrate 130. The reflective film 150C is disposed on the second substrate 130. The touch sensing structure TP is disposed on the first outer surface 110b of the first substrate 110. What distinguishes the touch apparatus 100C from the touch apparatus 100 is that, in this embodiment, the reflective film 150C may be a totally reflective film, and the display panel LCD may not be disposed in back of the reflective film 150C.

To conclude, in the touch apparatus according to an embodiment of the invention, at least a portion of the touch sensing structure is formed on the substrate of the electrochromic reflective mirror. Thus, the touch apparatus may be thinned.

It will be apparent to those skilled in the art that various modifications and variations can be made to the disclosed embodiments without departing from the scope or spirit of this invention. In view of the foregoing, it is intended that the invention covers modifications and variations provided that they fall within the scope of the following claims and their equivalents.

What is claimed is:

1. A touch apparatus, comprising:
    a first substrate comprising a first inner surface and a first outer surface opposite to each other;
    a first translucent electrode disposed on the first inner surface of the first substrate;
    a second substrate disposed opposite to the first substrate;
    an electrochromic layer located between the first inner surface of the first substrate and the second substrate;
    a reflective film disposed on the second substrate; and
    a touch sensing structure disposed on the first outer surface of the first substrate,
    wherein the second substrate comprises a second inner surface facing the electrochromic layer and a second outer surface opposite to the second inner surface, and the touch apparatus further comprises:
    a second translucent electrode disposed on the second inner surface of the second substrate, wherein the reflective film is disposed on the second outer surface of the second substrate and the display panel is disposed on the reflective film,
    wherein the first substrate further comprises a first side surface connecting the first inner surface and the first outer surface, and the first translucent electrode extends from the first inner surface to the first side surface, and the second substrate further comprises a second side surface connecting the second inner surface and the second outer surface, and the second translucent electrode extends from the second inner surface to the second side surface.

2. The touch apparatus according to claim 1, wherein the reflective film is a transflective film, and the touch apparatus further comprises:
    a display panel, wherein the display panel, the transflective film, the electrochromic layer, and the touch sensing structure are sequentially stacked in a normal direction of the first outer surface.

3. The touch apparatus according to claim 1, wherein the reflective film is a totally reflective film.

4. The touch apparatus according to claim 1, wherein the touch sensing structure comprises:

a first sensing unit formed by connecting a plurality of first sensing pads and a plurality of bridge lines in series and disposed on the first outer surface of the first substrate; and a second sensing unit intersecting the first sensing unit above the bridge lines and located in the same layer as the first sensing pads.

5. The touch apparatus according to claim 4, further comprising:

a protective substrate covering the touch sensing structure; and an optical adhesive layer, wherein the protective substrate is bonded to the touch sensing structure through the optical adhesive layer.

6. The touch apparatus according to claim 1, wherein the touch sensing structure comprises:

a plurality of first sensing units disposed on the first outer surface of the first substrate;

a protective substrate;

a plurality of second sensing units disposed on the protective substrate and intersecting the first sensing units; and an optical adhesive layer, wherein the second sensing units and the protective substrate are bonded to the first sensing units through the optical adhesive layer.

* * * * *